United States Patent
Yamaguchi et al.

(10) Patent No.: US 10,242,253 B2
(45) Date of Patent: Mar. 26, 2019

(54) DETECTION APPARATUS, DETECTION METHOD, AND COMPUTER PROGRAM PRODUCT

(71) Applicant: KABUSHIKI KAISHA TOSHIBA, Tokyo (JP)

(72) Inventors: Osamu Yamaguchi, Kanagawa (JP); Tomokazu Kawahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/443,469

(22) Filed: Feb. 27, 2017

(65) Prior Publication Data

US 2018/0075295 A1 Mar. 15, 2018

(30) Foreign Application Priority Data

Sep. 14, 2016 (JP) ................................. 2016-179497

(51) Int. Cl.

| | | |
|---|---|---|
| *G06K 9/00* | (2006.01) | |
| *G06F 3/01* | (2006.01) | |
| *G06F 21/32* | (2013.01) | |
| *G06K 9/32* | (2006.01) | |
| *H04N 1/00* | (2006.01) | |

(52) U.S. Cl.
CPC .......... *G06K 9/00362* (2013.01); *G06F 3/011* (2013.01); *G06F 3/013* (2013.01); *G06F 3/016* (2013.01); *G06F 3/017* (2013.01); *G06F 21/32* (2013.01); *G06K 9/0061* (2013.01);

(Continued)

(58) Field of Classification Search
CPC combination set(s) only.
See application file for complete search history.

(56) References Cited

U.S. PATENT DOCUMENTS 3,706,308 A * 12/1972 John .................... A61B 5/0245
600/483
6,310,619 B1 * 10/2001 Rice ........................ G06F 3/016
345/420

(Continued)

FOREIGN PATENT DOCUMENTS

| JP | 2006-85226 | 3/2006 |
| JP | 3974375 | 9/2007 |

(Continued)

OTHER PUBLICATIONS

Mita, T., "Discriminative Feature Co-Occurrence Selection for Object Detection", IEEE, Transaction Pattern Analysis and Machine Intelligence, vol. 30 No. 7, pp. 1257-1269 (2006).

(Continued)

*Primary Examiner* — Anand P Bhatnagar
(74) *Attorney, Agent, or Firm* — Finnegan, Henderson, Farabow, Garrett & Dunner, L.L.P.

(57) ABSTRACT

A detection apparatus according to an embodiment includes a first output control unit and a living body detection unit. The first output control unit performs controlling to output first output information in a first output form for giving a stimulus to a sense other than a sense of sight, and the first output information is made according to an action for a subject to make after closing of an eye. The living body detection unit detects whether the subject included in a first captured image captured after the first output information is output is a living body.

20 Claims, 9 Drawing Sheets

24A

| ACTION TO BE MADE AFTER EYES ARE CLOSED | FIRST OUTPUT INFORMATION | | |
|---|---|---|---|
| | SOUND PATTERN | VIBRATION PATTERN | WIND PATTERN |
| OPEN EYES | A1 | B1 | C1 |
| NOD HEAD | A2 | B2 | C2 |
| SHAKE HEAD | A3 | B3 | C3 |
| RAISE HAND | A4 | B4 | C4 |
| BEND KNEES | A5 | B5 | C5 |

(52) U.S. Cl.
CPC ..... *G06K 9/00604* (2013.01); *G06K 9/00906* (2013.01); *G06K 9/3233* (2013.01); *H04N 1/00* (2013.01)

(56) References Cited

U.S. PATENT DOCUMENTS

| | | | |
|---|---|---|---|
| 8,425,429 B2* | 4/2013 | Tommerdahl | A61H 23/00 600/300 |
| 9,025,830 B2* | 5/2015 | Ma | G06K 9/00221 382/107 |
| 2002/0045814 A1* | 4/2002 | Heid | G01R 33/4806 600/410 |
| 2002/0091335 A1* | 7/2002 | John | A61B 5/0002 600/544 |
| 2003/0039380 A1 | 2/2003 | Sukegawa et al. | |
| 2007/0031010 A1 | 2/2007 | Sukegawa et al. | |
| 2007/0112278 A1* | 5/2007 | Viertio-Oja | A61B 5/0484 600/559 |
| 2008/0275347 A1* | 11/2008 | Takala | A61B 5/0402 600/483 |
| 2011/0112426 A1* | 5/2011 | Causevic | A61B 5/048 600/544 |
| 2012/0027292 A1 | 2/2012 | Kozakaya et al. | |
| 2012/0063671 A1 | 3/2012 | Yamada et al. | |
| 2012/0070072 A1 | 3/2012 | Yuasa et al. | |
| 2012/0161969 A1* | 6/2012 | Husen | A61B 5/16 340/573.1 |
| 2012/0271372 A1* | 10/2012 | Osorio | A61B 5/7275 607/17 |
| 2017/0143241 A1* | 5/2017 | McBain | B64D 45/0015 |
| 2017/0228512 A1* | 8/2017 | Driscoll | G06F 19/3418 |

FOREIGN PATENT DOCUMENTS

| | | |
|---|---|---|
| JP | 5061563 | 10/2012 |
| JP | 5087037 | 11/2012 |
| JP | 5106459 | 12/2012 |
| JP | 5159950 | 3/2013 |
| WO | WO 2010/134200 A1 | 11/2010 |

OTHER PUBLICATIONS

Watanabe, T., "Co-occurrence Histogram of Oriented Gradients for Human Detection", IPSJ Transaction on Computer Vision and Applications, vol. 2, pp. 39-47 (2010).

Hemalatha, S., "A Study of Liveness Detection in Face Biometric Systems", International Journal of Computer Applications, vol. 91, No. 1, pp. 31-35 (2014).

* cited by examiner

| ACTION TO BE MADE AFTER EYES ARE CLOSED | FIRST OUTPUT INFORMATION | | |
|---|---|---|---|
| | SOUND PATTERN | VIBRATION PATTERN | WIND PATTERN |
| OPEN EYES | A1 | B1 | C1 |
| NOD HEAD | A2 | B2 | C2 |
| SHAKE HEAD | A3 | B3 | C3 |
| RAISE HAND | A4 | B4 | C4 |
| BEND KNEES | A5 | B5 | C5 |

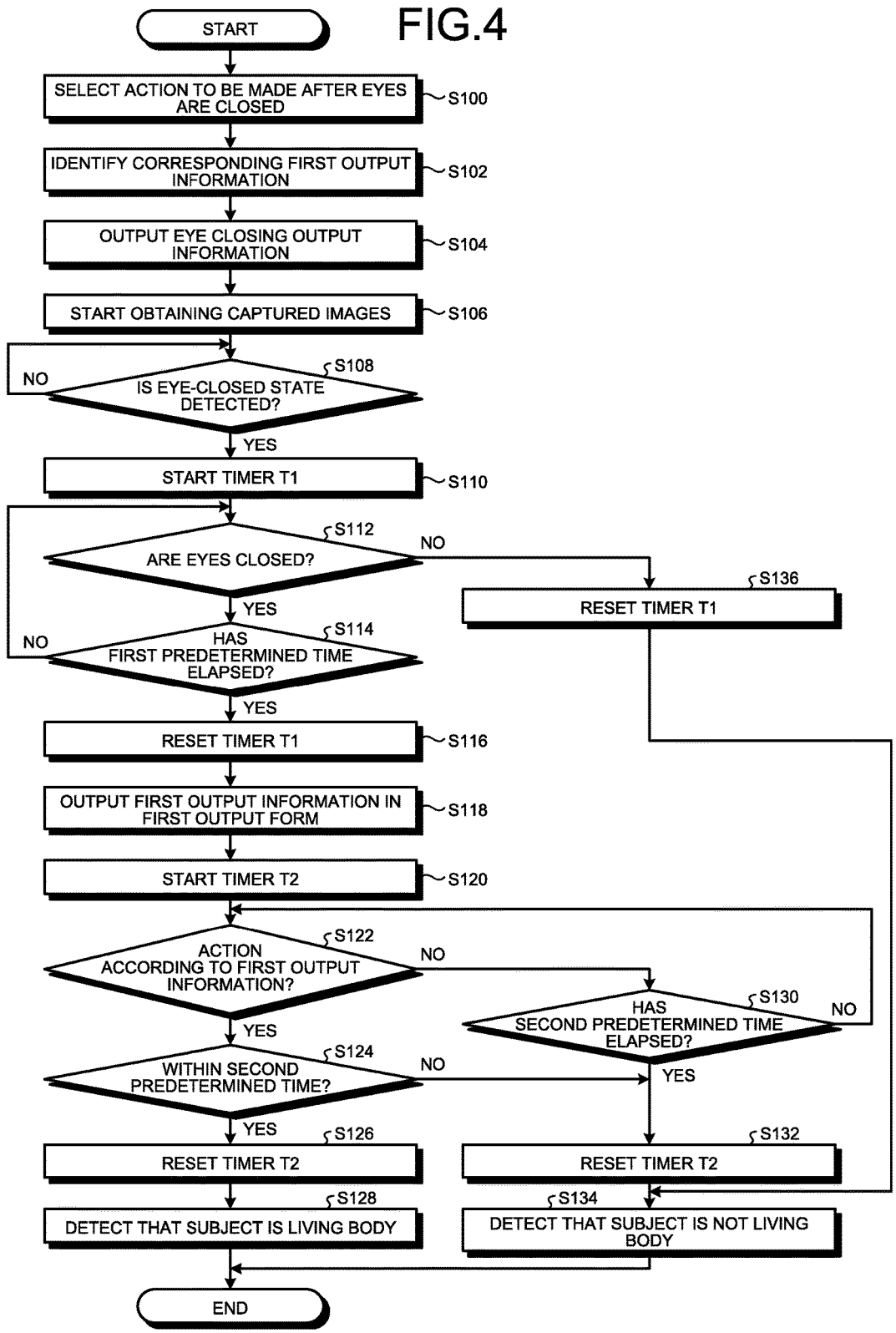

FIG.6A

| ACTION TO BE MADE IF FACE IS NOT DETECTED | SECOND OUTPUT INFORMATION | | |
|---|---|---|---|
| | SOUND PATTERN | VIBRATION PATTERN | WIND PATTERN |
| MOVE FACE INTO IMAGING ANGLE OF VIEW | D1 | E1 | F1 |

FIG.6B

| ERROR CONTENTS | ERROR OUTPUT INFORMATION | | |
|---|---|---|---|
| | SOUND PATTERN | VIBRATION PATTERN | WIND PATTERN |
| FACE DETECTION ERROR | G1 | H1 | I1 |
| EYE CLOSING DETECTION ERROR | G2 | H2 | I2 |
| LIVING BODY DETECTION ERROR | G3 | H3 | I3 |

DETECTION APPARATUS, DETECTION METHOD, AND COMPUTER PROGRAM PRODUCT

CROSS-REFERENCE TO RELATED APPLICATIONS

This application is based upon and claims the benefit of priority from Japanese Patent Application No. 2016-179497, filed on Sep. 14, 2016; the entire contents of which are incorporated herein by reference.

FIELD

Embodiments described herein relate generally to a detection apparatus, a detection method, and a computer program product.

BACKGROUND

Systems for detecting whether a subject is a living body have been known. For example, a system that performs biometric authentication by using the iris or irises of a subject's eyes is known. There are also known technologies for suppressing false detection when an artificial eye or a photograph is presented to a camera. For example, a system is known to guide the line of sight of a person at random to check whether the eyeballs are authentic before capturing an image of the irises. There has heretofore been disclosed no method for detecting whether a subject is a living body by checking a next action made with the eyes closed.

Conventionally, the user to be detected has always needed to stand in front of a camera with the eyes open and make an action such as moving the eyes. The user has needed to then wait for the completion of iris verification with the eyes maintained open. There has thus been a problem of poor usability during living body detection.

BRIEF DESCRIPTION OF THE DRAWINGS

FIG. 2 is a schematic diagram showing an example of a data configuration of a first output information management DB;

FIG. 4 is a flow chart showing an example of a procedure of detection processing;

FIGS. 6A and 6B are schematic diagrams showing an example of a data configuration of a second output information management DB and an error output information management DB;

DETAILED DESCRIPTION

A detection apparatus according to an embodiment includes a first output control unit and a living body detection unit. The first output control unit performs controlling to output first output information in a first output form for giving a stimulus to a sense other than a sense of sight, and the first output information is made according to an action for a subject to make after closing of an eye. The living body detection unit detects whether the subject included in a first captured image captured after the first output information is output is a living body.

A detection apparatus, a detection method, and a computer program product will be described in detail below with reference to the accompanying drawings.

First Embodiment

Figure 1:
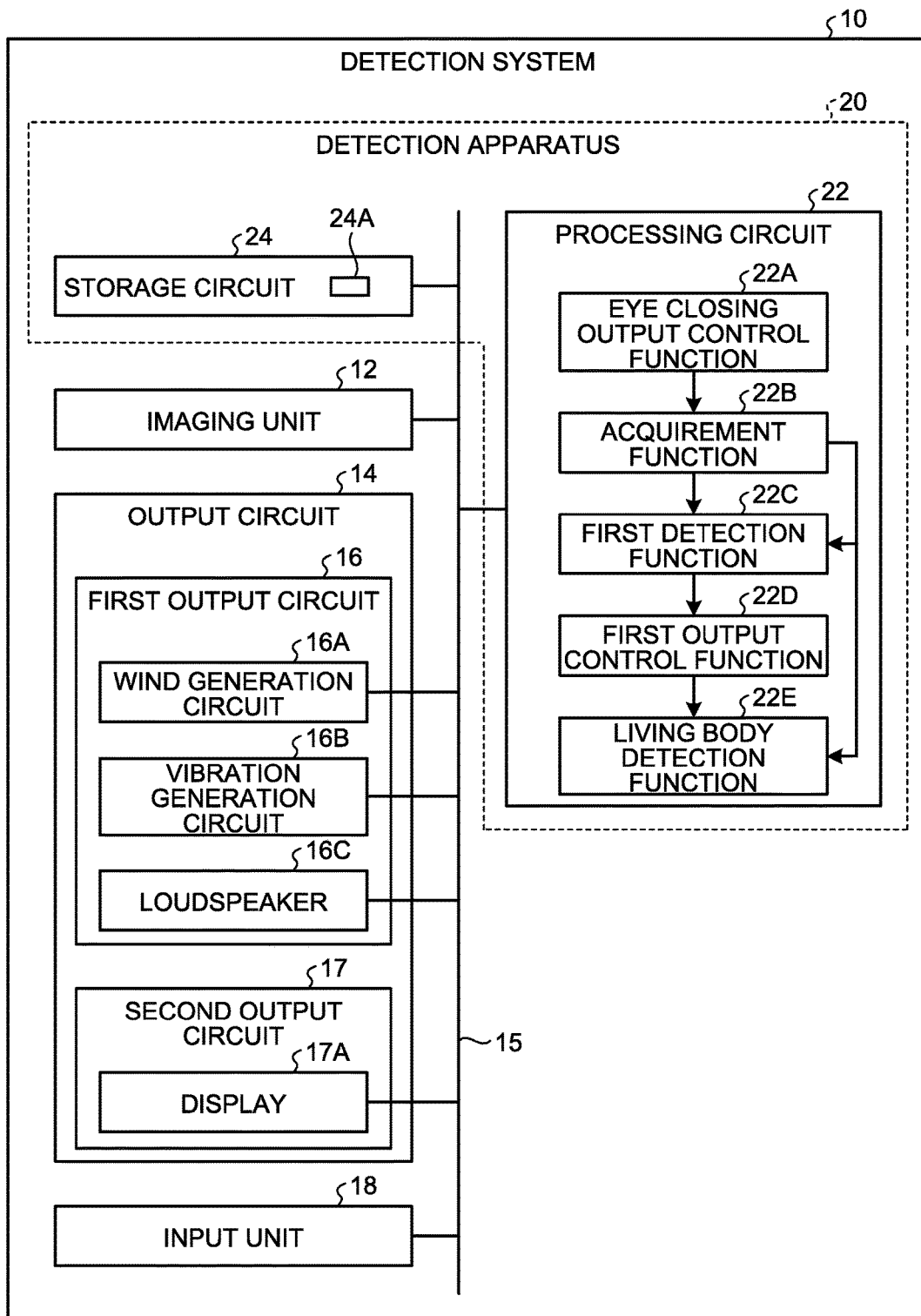
FIG. 1 is a diagram showing an example of a detection system according to a first embodiment.

FIG. 1 is a diagram showing an example of a detection system 10 according to the present embodiment. The detection system 10 is a system for performing living body detection.

The detection system 10 includes an imaging unit 12, an output circuit 14, an input unit 18, and a detection apparatus 20. The imaging unit 12, the output circuit 14, the input unit 18, and the detection apparatus 20 are connected via a bus 15.

The imaging unit 12 is an example of an imaging unit. The imaging unit 12 obtains a captured image by imaging.

The captured image is captured image data obtained by imaging (hereinafter, may be referred to simply as a captured image). Examples of the captured image include digital image data in which pixel values are defined pixel by pixel, and a depth map which expresses a distance from the imaging unit 12 pixel by pixel.

In the present embodiment, the imaging unit 12 captures an image of a subject lying within an imaging angle of view of the imaging unit 12 to obtain a captured image including the subject.

The subject is an object which is to be detected as to whether the object is a living body. For example, the subject may be a living body or a non-living body. A living body is a living thing. In the present embodiment, a living body refers to a living thing that has eyelids and can open and close the eyes. A non-living body is an object other than living bodies in the real world. Examples of the non-living body include an image of a living thing and a model of a living thing.

The output circuit 14 outputs various types of information. In the present embodiment, the output circuit 14 outputs output information. The output information is information output to outside the detection apparatus 20.

In the present embodiment, the output information includes first output information. The first output information is output information according to an action to be made after the eyes are closed. The first output information is set in advance. Details of the first output information will be described later.

In the present embodiment, the output circuit 14 includes a first output circuit 16 and a second output circuit 17.

The first output circuit 16 outputs the output information in a first output form. The first output form is an output form for giving a stimulus to a sense other than a sense of sight. Examples of the senses other than the sense of sight include senses of touch, hearing, taste, and smell. Senses of touch include, for example, senses of pain, temperature, pressure, position, and vibration.

In the present embodiment, the first output form is described to be at least one of wind, sound, and vibration. Specifically, in the present embodiment, the first output circuit 16 includes a wind generation circuit 16A, a vibration generation circuit 16B, and a loudspeaker 16C.

The wind generation circuit 16A is a device for generating wind. The wind generation circuit 16A outputs wind according to the output information. The wind generation circuit 16A is arranged in a position from which wind can be sent toward the subject lying within the imaging angle of view of the imaging unit 12. The wind generation circuit 16A may be a known device. In the present embodiment, the wind generation circuit 16A is a device that can adjust a wind pattern formed by a wind volume, a wind pressure, a wind rhythm, and the like. The wind generation circuit 16A is controlled by a processing circuit 22 to be described later.

The vibration generation circuit 16B is a device for generating vibrations. The vibration generation circuit 16B outputs vibrations according to the output information. The vibration generation circuit 16B vibrates a member (a wall, a floor, a ceiling, an electronic apparatus such as a terminal device, or the main body of the detection apparatus 20) lying within the imaging angle of view of the imaging unit 12. The vibration generation circuit 16B may further include a function of tilting a floor lying within the imaging angle of view of the imaging unit 12. The vibration generation circuit 16B may be a known device. In the present embodiment, the vibration generation circuit 16B is a device that can adjust a vibration pattern. The vibration pattern is a pattern exhibiting different magnitudes of vibrations, or a waveform cycle or vibration rhythm expressed by different magnitudes of vibrations. The vibration generation circuit 16B is controlled by the processing circuit 22 to be described later.

The loudspeaker 16C is a device for outputting sound. The loudspeaker 16C outputs sound according to the output information. The loudspeaker 16C is arranged in a position where sound can be output into the imaging angle of view of the imaging unit 12. The loudspeaker 16C may be a known device. In the present embodiment, the loudspeaker 16C is a device that can adjust a sound pattern formed by sound types, sound volumes, sound lengths, sound rhythms, and the like. The loudspeaker 16C is controlled by the processing circuit 22 to be described later.

The second output circuit 17 outputs the output information in a second output form. The second output form is an output form for giving a stimulus to the sense of sight. In the present embodiment, the second output form is an output form for stimulating the sense of sight by light. Specifically, in the present embodiment, the second output circuit 17 includes a display 17A. The display 17A displays the output information. The display 17A outputs light, a display image, a projection image, or the like according to the output information. Examples of the display 17A include a known liquid crystal display (LCD), projection apparatus, and lamp.

The output circuit 14 may further include a communication circuit for transmitting the output information to another apparatus. The communication circuit transmits the output information to an external apparatus via a known communication line.

The input unit 18 accepts various instructions and information input from the user. Examples of the input unit 18 include a pointing device such as a mouse and a trackball, and an input device such as a keyboard. The input unit 18 may be an input function of a touch panel integrally provided on the display 17A.

Next, the detection apparatus 20 will be described. The detection apparatus 20 is an apparatus for detecting whether a subject is a living body.

The detection apparatus 20 includes a storage circuit 24 and the processing circuit 22. The storage circuit 24 and the processing circuit 22 are connected via the bus 15. That is, the imaging unit 12, the output circuit 14, the input unit 18, the storage circuit 24, and the processing circuit 22 are connected via the bus 15.

At least one of the imaging unit 12, the output circuit 14, the input unit 18, and the storage circuit 24 may be connected to the processing circuit 22 in a wired or wireless manner. At least one of the imaging unit 12, the output circuit 14, the input unit 18, and the storage circuit 24, may be connected with the processing circuit 22 via a network. The detection apparatus 20 may be mounted on a cloud server which performs processing on a cloud basis.

The storage circuit 24 stores various types of data. The storage circuit 24 is an example of a memory. In the present embodiment, the storage circuit 24 stores a first output information management DB 24A in advance (details will be described later). Examples of the storage circuit 24 include a semiconductor memory device such as a random access memory (RAM) and a flash memory, a hard disk, and an optical disc. The storage circuit 24 may be a storage device provided outside the detection apparatus 20. The storage circuit 24 may be a storage medium. Specifically, the storage medium may be one into which programs and various types of information are downloaded and stored, or temporarily stored, via a local area network (LAN), the Internet, or the like. The storage circuit 24 may include a plurality of storage media.

Next, the processing circuit 22 will be described. The processing circuit 22 is an example of processing circuitry. The processing circuit 22 includes an eye closing output control function 22A, an acquirement function 22B, a first detection function 22C, a first output control function 22D, and a living body detection function 22E.

The processing functions of the processing circuit 22 are stored in the storage circuit 24 in the form of computer-executable programs. The processing circuit 22 is a processor that reads the programs from the storage circuit 24 and executes the programs to implement the functions corresponding to the respective programs.

Having read the programs, the processing circuit 22 has the functions shown in the processing circuit 22 of FIG. 1. In FIG. 1, the eye closing output control function 22A, the acquirement function 22B, the first detection function 22C, the first output control function 22D, and the living body detection function 22E are described to be implemented by a single processing circuit 22.

A plurality of independent processors for implementing the respective functions may be combined to constitute the processing circuit 22. In such a case, the processors execute a program(s) to implement the respective functions. The processing functions may be configured as respective programs, and a single processing circuit may execute the programs. A specific function or functions may be implemented by a dedicated independent program execution circuit(s).

As employed in the present and subsequent embodiments, the term "processor" refers to the circuit of, for example, a central processing unit (CPU), a graphical processing unit (GPU), an application specific integrated circuit (ASIC), a programmable logic device (such as a simple programmable logic device (SPLD) and a complex programmable logic device (CPLD)), or a field programmable gate array (FPGA).

The processor implements the functions by reading and executing the programs stored in the storage circuit 24. Instead of the programs being stored in the storage circuit 24, the programs may be configured to be directly built in the circuit of the processor. In such a case, the processor implements the functions by reading and executing the programs built in the circuit.

The eye closing output control function 22A controls the output circuit 14 to output the output information according to an action of closing the eyes. The output information according to the action of closing the eyes (hereinafter, referred to as eye closing output information) is output information for prompting a living body to make "the action of closing the eyes." Examples of the eye closing output information include words for prompting the closing of the eyes, an image of a face with the eyes closed, and a signal pattern representing the closing of the eyes. An example of the words for prompting the closing of the eyes is "close your eyes." The signal pattern representing the closing of the eyes is a signal pattern for prompting a state in which the living body accepting the signal has its eyes closed.

In the present embodiment, the eye closing output control function 22A controls the second output circuit 17 to output the eye closing output information in the second output form. For example, characters such as "close your eyes" or an image of a face with the eyes closed according to the signal pattern representing the closing of the eyes is displayed on the display 17A of the second output circuit 17.

The eye closing output control function 22A may also control the first output circuit 16 to output the eye closing output information in the first output form.

For example, the eye closing output control function 22A controls the loudspeaker 16C to output a sound pattern according to the signal pattern such that the living body enters an eye-closed state. For example, the eye closing output control function 22A controls the loudspeaker 16C to output a sound pattern expressing the words for prompting the closing of the eyes, "close your eyes." In such a case, the loudspeaker 16C outputs the sound "close your eyes" as the output information. The sound pattern may be a pattern of signal sounds like "beep beep."

For example, the eye closing output control function 22A controls the wind generation circuit 16A and the vibration generation circuit 16B to output a wind pattern and a vibration pattern represented by the signal pattern such that the living body enters the eye-closed state. In such a case, the wind generation circuit 16A sends air toward a position in which the eyes of the living body are predicted to be located, with a wind pattern of wind volumes or wind pressures such that the living body closes the eyes. The vibration generation circuit 16B vibrates an object around the imaging unit 12 to produce vibrations around the imaging unit 12 with a vibration pattern such that the living body closes the eyes. Specifically, the vibration generation circuit 16B vibrates an object such as a floor or wall around the imaging unit 12, a portable terminal lying around the imaging unit 12, and the main body of the detection apparatus 20. The vibration function of a mobile phone terminal may be used.

The eye closing output control function 22A may individually control one or more of the wind generation circuit 16A, the vibration generation circuit 16B, the loudspeaker 16C, and the display 17A to output the eye closing output information in the first output form and/or the second output form.

The acquirement function 22B obtains the captured image from the imaging unit 12. In the present embodiment, the imaging unit 12 sequentially captures images within the imaging angle of view, and sequentially outputs the captured images obtained by the imaging to the acquirement function 22B. The acquirement function 22B sequentially obtains the captured images from the imaging unit 12. Each time a captured image is obtained, the acquirement function 22B sequentially outputs the obtained captured image to the first detection function 22C and the living body detection function 22E.

Next, the first output control function 22D will be described. The first output control function 22D is an example of a first output control unit. The first output control function 22D outputs the first output information in the first output form.

In the present embodiment, the first output control function 22D outputs the first output information in the first output form after the eye closing output information is output from the output circuit 14 by the eye closing output control function 22A.

Living body detection is performed by the living body detection function 22E to be described later. The first output control function 22D outputs the first output information in the first output form. As described above, the first output form is an output form for giving a stimulus to a sense other than the sense of sight. The first output control function 22D controls the first output circuit 16 to output the first output information in the output form for giving a stimulus to the sense other than the sense of sight.

The first output information is output information according to an action to be made after the eyes are closed. In other words, the first output information is output information for prompting the action to be made after the eyes are closed.

The action to be made after the eyes are closed may be defined in advance. The action to be made after the eyes are closed may be one or a combination of a plurality of actions that the living body can make. Specifically, the action to be made after the eyes are closed is an action of moving at least a part of the body of the living body. Examples of the action to be made after the eyes are closed include opening the eyes, opening the mouth, raising an eyebrow or eyebrows, moving the head, moving a hand or hands, moving a shoulder or shoulders, and moving a leg or legs. For example, the action of moving the head is an action to move the head in three dimensions. Examples of the action to move the head in three dimensions include nodding the head, shaking the head, turning the head to a designated direction, and turning the head around. Examples of the action of moving the hand(s) include raising a hand. Examples of the action of moving the leg(s) include bending knees.

Specifically, the first output information may be a signal pattern according to the action to be made after the eyes are closed. For example, the signal pattern is expressed by words describing the action to be made after the eyes are closed, tone pitches, or a combination of rhythms produced by different magnitudes of sound, wind, and/or vibration. In other words, the signal pattern according to the action to be made after the eyes are closed is expressed by a sound pattern, a vibration pattern, a wind pattern, and like.

In the present embodiment, the first output information includes at least one of a sound pattern, a vibration pattern, and a wind pattern according to the action to be made after the eyes are closed.

The detection apparatus 20 registers the first output information corresponding to the action to be made after the eyes are closed into the first output information management DB 24A in advance.

FIG. 2 is a schematic diagram showing an example of a data configuration of the first output information management DB 24A. The first output information management DB 24A is a database which associates actions to be made after the eyes are closed with first output information. The data form of the first output information management DB 24A is not limited to a database. The first output information management DB 24A may be a table or the like.

A plurality of types of actions to be made after the eyes are closed are previously registered in the first output information management DB 24A. In view of a reduction of living body detection time, actions that do not consume time are preferably registered in the first output information management DB 24A as the actions to be made after the eyes are closed. From such a viewpoint, for example, the actions to be made after the eyes are closed are preferably ones that can be made in a short time, like opening the eyes.

From the viewpoint of improving the living body detection accuracy, an action to move at least a part of the body of the living body in three dimensions is preferably registered in the first output information management DB 24A as an action to be made after the eyes are closed. From such a viewpoint, for example, the actions to be made after the eyes are closed are preferably ones to move at least part of the body in three dimensions, like opening the mouth, turning the head to a designated direction, and turning the head around.

Sound patterns, vibration patterns, and wind patterns are registered in advance in the first output information management DB 24A as the first output information corresponding to the actions to be made after the eyes are closed. Examples of the sound patterns included in the first output information include a sound for prompting the corresponding action to be made after the eyes are closed (for example, "open your eyes") and a pattern of sound for prompting the action (for example, a "ding dong" sound). Examples of the vibration patterns included in the first output information include a pattern of vibrations for prompting the corresponding action to be made after the eyes are closed. The wind patterns included in the first output information include a pattern of wind for prompting the corresponding action to be made after the eyes are closed.

Different pieces of first output information corresponding to the respective actions to be made after the eyes are closed are registered in advance in the first output information management DB 24A. In the example shown in FIG. 2, different sound patterns (A1 to A5), different vibration patterns (B1 to B5), and different wind patterns (C1 to C5) corresponding to the respective actions to be made after the eyes are closed are registered in advance.

For example, a sound pattern A1 is output information representing a voice "open your eyes." For example, a vibration pattern B1 is output information representing vibrations "bzzzz bzzzz."

Each of the sound patterns, vibration patterns, and wind patterns is not limited to a constant rhythm or magnitude. A pattern may change in at least one of rhythm, magnitude, and in the case of sound, tone pitch in the middle. For example, a sound pattern may be such that a constant volume of sound is output and then goes out. For example, a vibration pattern may be such that a certain pattern of vibrations continues before disappearing.

At least one of sound patterns, vibration patterns, and wind patterns may be registered in advance in the first output information management DB 24A in association with an action to be made after the eyes are closed. For example, both sound patterns A1 and A2 may be registered in the first output information management DB 24A as sound patterns corresponding to "opening the eyes." In such a case, for example, two types of sound representing "open your eyes" corresponding to the sound pattern A1 and "nod your head" corresponding to the sound pattern A2 are output as the first output information.

The first output control function 22D selects one of the plurality of actions to be made after the eyes are closed, registered in the first output information management DB 24A. For example, the first output control function 22D selects a predetermined action. The first output control function 22D may accept a type of action designated by the user's operation instructions from the input unit 18. In such a case, the first output control function 22D may select "the action to be made after the eyes are closed" corresponding to the type of action accepted from the input unit 18 from the first output information management DB 24A.

The first output control function 22D controls the first output circuit 16 to output the first output information corresponding to the selected action to be made after the eyes are closed, registered in the first output information management DB 24A, in the first output form.

Specifically, the first output control function 22D controls the loudspeaker 16C to output the sound of the sound pattern included in the first output information read from the first output information management DB 24A. The first output control function 22D controls the vibration generation circuit 16B to generate the vibrations of the vibration pattern included in the first output information read from the first output information management DB 24A. The first output control function 22D controls the wind generation circuit 16A to generate the wind of the wind pattern included in the first output information read from the first output information management DB 24A.

As a result, the sound, vibrations, and wind according to the first output information output from the first output circuit 16 are output around the imaging unit 12.

Any one or two of the sound, vibration, and wind patterns may be previously registered as the first output information in the first output information management DB 24A. In other words, the first output control function 22D may control the first output circuit 16 to output at least one of the sound, vibration, and wind patterns according to the action to be made after the eyes are closed as the first output information.

By the instruction of the first output control function 22D, if there is a living body around the imaging unit 12, the living body is instructed by the detection apparatus 20 about the action to be made after the eyes are closed.

The first detection function 22C is an example of a first detection unit. The first detection function 22C detects that a subject is in an eye-closed state. The first detection function 22C uses the captured images obtained by the acquirement function 22B to detect whether the subject included in the captured images is in the eye-closed state.

As described above, the acquirement function 22B sequentially obtains the captured images from the imaging unit 12. In the present embodiment, the captured images captured by the imaging unit 12 are classified into first captured images and second captured images according to the timing for imaging. In other words, the first captured images and the second captured images are different from timing for imaging. The imaging unit 12 capturing the first captured images and the imaging unit 12 capturing the second captured images may be the same imaging unit or different imaging units. In other words, the first captured images and the second captured images may be captured and obtained by respective different cameras. The first captured images and the second captured images may be captured by the same camera.

A first captured image is a captured image captured after the first output information is output from the first output control function 22D. More specifically, a first captured image is one captured after the output of the first output information among the captured images captured by the imaging unit 12 during one cycle of detection processing of the processing circuit 22 to be described later. One cycle of detection processing refers to a series of processes for detecting whether a subject is a living body. Specifically, one cycle of detection processing refers to that with the processing of steps S100 to S136 as one cycle (see FIG. 4). Details of the detection processing will be described later.

A second captured image is a captured image captured before the first output information is output from the first output control function 22D. More specifically, a second captured image is one captured before the output of the first output information among the captured images captured by the imaging unit 12 during one cycle of detection processing of the processing circuit 22 to be described later.

The first detection function 22C detects that the subject is in eye-closed state on the basis of a second captured image captured before the output of the first output information. The first detection function 22C detects the eyes of the subject included in the second captured image and detects whether the eyes are closed, by using a known image processing technology.

Figure 3A:
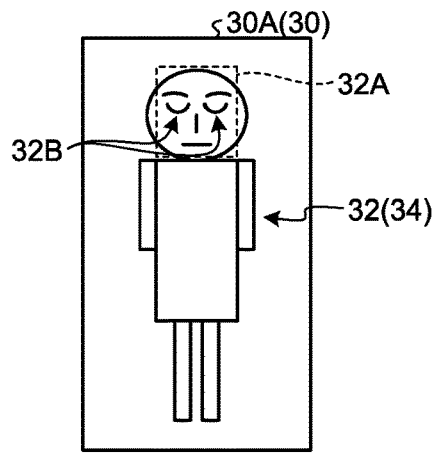
FIGS. 3A to 3E are schematic diagrams showing examples of captured images.

FIGS. 3A to 3E are schematic diagrams showing examples of captured images 30. FIG. 3A is a schematic diagram showing an example of a second captured image 30A. Suppose that the second captured image 30A includes a person 32 as a subject 34. In such a case, for example, the first detection function 22C identifies a face 32A of the person 32 included in the second captured image 30A by using a known face detection technology. An example of the known face detection technology is described in non-patent literature 1 (Takeshi Mita, Toshimitsu Kaneko, Bjorn Stenger, Osamu Hori: "Discriminative Feature Co-Occurrence Selection for Object Detection," IEEE Transaction Pattern Analysis and Machine Intelligence Volume 30, Number 7, July 2008, pp. 1257-1269).

The first detection function 22C further identifies an area of eyes 32B in the face 32A, and detects whether the eyes 32B are closed. Whether the eyes 32B are closed may be detected by using a known image processing technology. For example, the known image processing technology uses CoHOG features described in non-patent literature 2 (Tomoki Watanabe, Satoshi Ito, Kentaro Yokoi: "Co-occurrence Histogram of Oriented Gradients for Human Detection," IPSJ Transaction on Computer Vision and Applications Volume 2 March 2010, pp. 39-47). Features of images with eyes open and images with eyes closed are previously determined from a large amount of eye area images to construct a support vector machine (SVM)-based identifier or the like. The identifier is used to determine whether eyes are open or closed based on the features obtained from each eye area.

FIG. 3A shows a case in which the eyes 32B of the person 32 are closed. If the subject 34 is detected to be in the eye-closed state, the first output control function 22D may output the first output information in the first output form.

The first detection function 22C preferably detects that the subject 34 maintains the eye-closed state for a first predetermined time based on the second captured image 30A. The first predetermined time is an elapsed time since the timing when the eye-closed state is first detected by the first detection function 22C in one cycle of detection processing to be described later. For example, the first detection function 22C may include an internal timer, and count the first predetermined time according to the count of the internal timer.

In such a case, the first output control function 22D may output the first output information in the first output form if the subject 34 is detected to maintain the eye-closed state for the first predetermined time.

The first predetermined time may be determined in advance. For example, the first predetermined time may be previously defined as a maximum value of time predicted to be needed for the person 32 to move the eyelids from an open state to a closed state, or a value obtained by adding a certain time to the maximum value. The first predetermined time may be able to be changed as appropriate. For example, the first predetermined time may be changed according to the user's operation instructions to the input unit 18. The first predetermined time may be made variable to improve the accuracy of the living body detection. The first predetermined time may be determined by using random numbers or the like.

Referring back to FIG. 1, a description will be continued. The living body detection function 22E is an example of a living body detection unit. The living body detection function 22E detects whether a subject included in a first captured image captured after the output of the first output information is a living body.

As described above, the first output information is output information according to the action to be made after the eyes are closed. The first output information is being output from the first output circuit 16 in the first output form by the first output control function 22D.

The first output information is thus being output in the first output form within the imaging angle of view of the imaging unit 12. In other words, at least one of the sound pattern, the wind pattern, and the vibration pattern according to the action to be made after the eyes are closed is being output around the imaging unit 12.

If there is a living body, for example, the person 32 around the imaging unit 12, the person 32 makes the action according to the first output information. Suppose, for example, that the first output information is "open your eyes" corresponding to the sound pattern A1. If the person 32 around the imaging unit 12 makes the action according to the first output information, the person 32 makes the action of opening the eyes. Suppose, for example, that the first output information is "nod your head" corresponding to the sound pattern A2. If the person 32 around the imaging unit 12 makes the action according to the first output information, the person 32 makes the action of nodding the head.

There may be no living body around the imaging unit 12 but a non-living body such as a model of a human body. In such a case, the non-living body is difficult to make the action according to the first output information.

In the present embodiment, the living body detection function 22E then determines whether the subject 34 included in the first captured image makes the action according to the first output information output immediately before, on the basis of the first captured image. If the subject 34 is determined to make the action according to the first output information, the living body detection function 22E detects that the subject 34 is a living body.

Figure 3B:
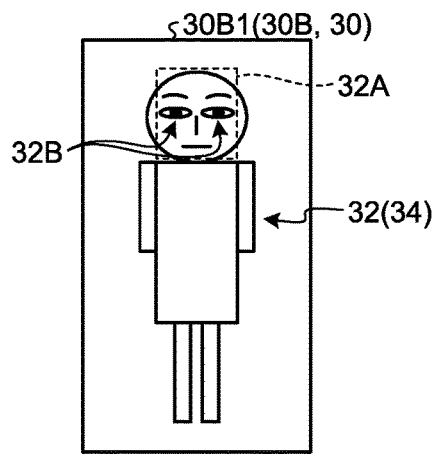
Figure 3C:
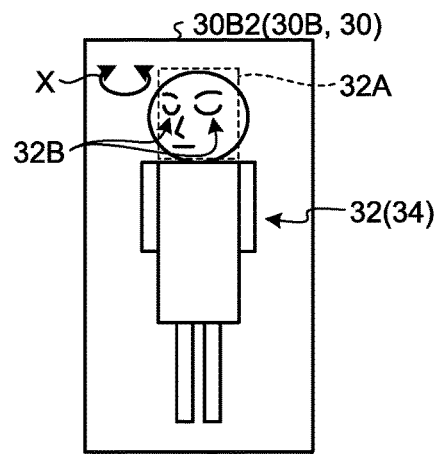
Figure 3D:
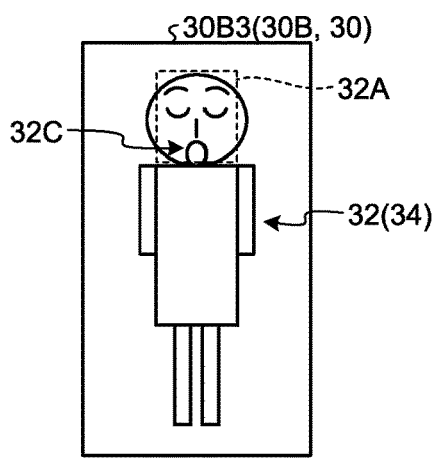

FIGS. 3B to 3D are schematic diagrams showing examples of a first captured image 30B.

Suppose, for example, that the first output information output immediately before is the output information according to the action of opening the eyes. Suppose also that a first captured image 30B1 shown in FIG. 3B is captured after the output of the first output information. In such a case, the living body detection function 22E identifies the position of the face 32A of the subject 34 included in the first captured image 30B1 by using a known face detection technology. The living body detection function 22E further identifies an area of the eyes 32B in the face 32A and detects whether the eyes 32B are open. In the example shown in FIG. 3B, the eyes 32B of the person 32 are open.

In such a case, the living body detection function 22E determines that the subject 34 included in the first captured image 30B1 makes the action according to the first output information output immediately before. The living body detection function 22E then detects that the subject 34 included in the first captured image 30B1 is a living body (here, person 32).

If the action according to the first output information is one that a plurality of captured images 30 need to be used to determine, the living body detection function 22E may determine whether the action is made by using a plurality of first captured images 30B.

Suppose, for example, that the first output information output immediately before is output information according to the action of shaking the head. Suppose also that after the output of the first output information, a plurality of first captured images 30B including a first captured image 30B2 shown in FIG. 3C are sequentially captured. In such a case, the living body detection function 22E may determine from the plurality of first captured images 30B whether the subject 34 included in the first captured images 30B makes the action, by using a known image processing technology.

For example, the living body detection function 22E identifies the face 32A of the subject 34 included in the first captured image 30B2 by using a known face detection technology. The living body detection function 22E further identifies characteristic parts (such as the eyes 32B and a mouth 32C) in the face 32A. The living body detection function 22E similarly identifies characteristic parts in the face 32A in the rest of the plurality of first captured images 30B sequentially captured with the first captured image 30B2 as an image sequence. The living body detection function 22E then recognizes a movement and the like of the characteristic parts between the plurality of first captured images 30B to determine whether the face 32A is shaken.

If the subject 34 included in the first captured images 30B is determined to make the action of "shaking the head" according to the first output information output immediately before, the living body detection function 22E detects that the subject 34 is a living body. The face direction may be determined by using a known technology (for example, Japanese Patent No. 5159950). The subject 34 is determined to be a living body if the determined face direction changes in a set direction.

If the first output information is output information according to an action other than the action of opening the eyes, the living body detection function 22E may perform the following processing. For example, the living body detection function 22E may detect that the subject 34 is a living body if the subject 34 included in the first captured image 30B is determined to make the action according to the first output information output immediately before while maintain the eye-closed state.

Suppose, for example, that the first output information output immediately before is output information according to the action of opening the mouth. Suppose also that after the output of the first output information, a plurality of first captured images 30B including a first captured image 30B3 shown in FIG. 3D are sequentially captured. In such a case, the living body detection function 22E may determine from the plurality of first captured images 30B whether the subject 34 included in the first captured images 30B makes the action, by using a known image processing technology.

For example, the living body detection function 22E identifies the face 32A of the subject 34 included in the first captured image 30B3 by using a known face detection technology. The living body detection function 22E further identifies the mouth 32C in the face 32A. The living body detection function 22E then determines whether the action of opening the mouth is made, by determining whether the mouth 32C in the first captured images 30B shows the shape of an open mouth 32C.

If the subject 34 included in the first captured images 30B is determined to make the action of "opening the mouth" according to the first output information output immediately before, the living body detection function 22E detects that the subject 34 is a living body.

Figure 3E:
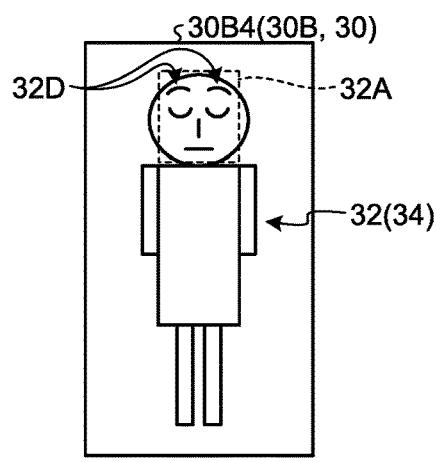

Suppose, for example, that the first output information output immediately before is output information according to the action of raising the eyebrows. Suppose also that after the output of the first output information, a plurality of first captured images 30B including a first captured image 30B4 shown in FIG. 3E are sequentially captured. In such a case, the living body detection function 22E may determine from the plurality of first captured images 30B whether the subject 34 included in the first captured images 30B makes the action, by using a known image processing technology.

For example, the living body detection function 22E identifies the face 32A of the subject 34 included in the first captured image 30B4 by using a known face detection technology. The living body detection function 22E further identifies eyebrows 32D in the face 32A. The living body detection function 22E similarly identifies the eyebrows 32D in the face 32A from the rest of the plurality of first captured images 30B sequentially captured with the first captured image 30B4 as an image sequence. The living body detection function 22E then determines whether the action of raising the eyebrows 32D is made, by recognizing a movement of the eyebrows 32D to a raised position in the face 32A between plurality of first captured images 30B.

If the subject 34 included in the first captured images 30B is determined to make the action of "raising the eyebrows" according to the first output information output immediately before, the living body detection function 22E detects that the subject 34 is a living body.

The living body detection function 22E may repeat a series of processes for determining that the person 32 makes an action according to the first output information based on the first captured image(s) 30B captured after the output control of the first output information a plurality of times. The living body detection function 22E may detect that the subject 34 is a living body if the subject 34 is determined to make the action according to the first output information output immediately before in each of the series of processes.

In such a case, the first output information output in each of the series of processes repeated may be of the same type or different types. For example, the living body detection function 22E may determine that the person 32 makes the action of "shaking the head" after the output of the first output information according to that action (action of shaking the head). The living body detection function 22E may then determine that the person 32 makes the action of opening the mouth after the output of the first output information according to that action (action of opening the mouth). In such a case, the living body detection function 22E may detect that the subject 34 is a living body.

The living body detection function 22E may use a captured image 30 captured within a second predetermined time since the output of the first output information as a first captured image 30B. In such a case, the living body detection function 22E may determine whether the subject 34 included in the first captured image 30B is a living body, on the basis of this first captured image 30B.

The second predetermined time may be defined in advance. The second predetermined time may be adjusted according to the first output information output immediately before. For example, the second predetermined time may be defined as a maximum value of time predicted to be needed for a living body to make the action according to the first output information output immediately before. The second predetermined time may be able to be changed as appropriate. For example, the second predetermined time may be able to be changed by the user's operation instructions to the input unit 18.

The living body detection function 22E may store information representing the detection result into the storage circuit 24. The living body detection function 22E may output the information representing the detection result from the output circuit 14.

Suppose, for example, that the detection result represents being a living body. In such a case, the living body detection function 22E may control the output circuit 14 to output the output information representing that a living body is detected.

Suppose, for example, that the detection result represents not being a living body. In such a case, the living body detection function 22E may control the output circuit 14 to output the output information representing that no living body is detected.

Next, an example of a procedure of the detection processing performed by the processing circuit 22 will be described. FIG. 4 is a flow chart showing an example of the procedure of the detection processing performed by the processing circuit 22.

The processing circuit 22 performs the detection processing shown in FIG. 4 when to perform the detection processing is instructed. For example, an instruction to perform the detection processing is input by the user's operation instructions to the input unit 18 or the like. The processing circuit 22 may perform the detection processing shown in FIG. 4 at predetermined time intervals.

Initially, the first output control function 22D selects one of the plurality of actions to be made after the eyes are closed, registered in the first output information management DB 24A (step S100). For example, the first output control function 22D selects an action determined in advance.

Next, the first output control function 22D identifies the first output information corresponding to the action to be made after the eyes are closed, selected in step S100, from the first output information management DB 24A (step S102).

Next, the eye closing output control function 22A controls the output circuit 14 to output the eye closing output information (step S104).

By the processing of step S104, output information for prompting the closing of the eyes is output into the imaging angle of view of the imaging unit 12. For example, by the processing of step S104, a sound "close your eyes" is output from the loudspeaker 16C. For example, vibrations of the vibration pattern for prompting the closing of the eyes are generated by the vibration generation circuit 16B. Wind of the wind pattern for prompting the closing of the eyes is generated by the wind generation circuit 16A. For example, by the processing of step S104, an image of a face with eyes closed and/or a display image showing a message for prompting the closing of the eyes is/are displayed on the display 17A.

If a living body such as a person 32 lying around the imaging unit 12 follows the eye closing output information, the living body makes the action of closing the eyes.

Next, the acquirement function 22B starts obtaining captured images 30 captured by the imaging unit 12 (step S106). By the processing of step S106, the acquirement function 22B starts processing for sequentially obtaining the captured images 30 captured by the imaging unit 12, and sequentially outputting the captured images 30 to the first detection function 22C and the living body detection function 22E in the order of acquisition.

Next, the first detection function 22C repeats a negative determination (step S108: No) until the subject 34 is detected to be in an eye-closed state based on the second captured image 30A obtained by the acquirement function 22B. In step S108, the first detection function 22C sequentially obtains second captured images 30A sequentially output from the acquirement function 22B. The first detection function 22C sequentially obtains new second captured images 30A until the subject 34 included in an obtained second captured images 30A is detected to be in the eye-closed state.

If the first detection function 22C detects that the subject 34 is in the eye-closed state (step S108: Yes), the processing proceeds to step S110.

In step S110, the first detection function 22C starts a timer T1 for counting the foregoing first predetermined time (step S110). By using a new second captured image 30A output from the acquirement function 22B, the first detection function 22C then determines whether the eyes of the subject 34 included in the second captured image 30A are closed (step S112).

If the first detection function 22C determines that the eyes are closed (step S112: Yes), the processing proceeds to step S114. In step S114, the first detection function 22C determines whether the first predetermined time has elapsed since the start of the timer T1 in step S110 (step S114).

If the first predetermined time has not elapsed (step S114: No), the processing returns to the foregoing step S112. On the other hand, if the first predetermined time has elapsed (step S114: Yes), the processing proceeds to step S116. In step S116, the first detection function 22C resets the timer T1 started in step S110 (step S116).

By the processing of steps S108 to S114, the first detection function 22C detects that the subject 34 maintains the eye-closed state for the first predetermined time.

Next, the first output control function 22D outputs the first output information in the first output form (step S118). In step S118, the first output control function 22D controls the first output circuit 16 to output the first output information identified in step S102.

By the processing of step S118, the first output information according to the action to be made after the eyes are closed is output around the imaging unit 12 in the first output form for giving a stimulus to a sense other than the sense of sight. More specifically, at least one of the sound pattern, the vibration pattern, and the wind pattern according to the action to be made after the eyes are closed is output around the imaging unit 12.

If there is a living body, for example, the person 32 around the imaging unit 12, the person 32 therefore makes the action according to the first output information output in step S118.

Next, the living body detection function 22E starts a timer T2 for counting the foregoing second predetermined time (step S120). Next, by using a new first captured image 30B output from the acquirement function 22B, the living body detection function 22E determines whether the subject 34 included in the first captured image 30B makes the action according to the first output information output in step S118 (step S122).

If the living body detection function 22E determines that the action according to the first output information is made (step S122: Yes), the processing proceeds to step S124. In step S124, the living body detection function 22E determines whether the elapsed time since the start of the timer T2 in step S120 is within the second predetermined time (step S124).

If the determination in step S124 is positive (step S124: Yes), the processing proceeds to step S126. In step S126, the living body detection function 22E resets the timer T2 started in step S120 (step S126). To reset a timer means to set the count of the timer at "0."

Next, the living body detection function 22E detects that the subject 34 included in the first captured image 30B is a living body (for example, person 32) (step S128). More specifically, if the subject 34 included in the first captured image 30B makes the action according to the first output information output immediately before within the second predetermined time after the output of the first output information, the living body detection function 22E detects that the subject 34 is a living body. The present routine ends. As described above, the living body detection function 22E may output the detection result from the output circuit 14 before the present routine ends.

On the other hand, if the determination in the foregoing step S122 is negative (step S122: No), the processing proceeds to step S130. In step S130, the living body detection function 22E determines whether the elapsed time since the start of the timer T2 in step S120 exceeds the second predetermined time (step S130).

If the determination in step S130 is negative (step S130: No), the processing returns to the foregoing step S122. On the other hand, if the determination in step S130 is positive (step S130: Yes), the processing proceeds to step S132. If the determination in the foregoing step S124 is negative (step S124: No), the processing also proceeds to step S132.

In step S132, the living body detection function 22E resets the timer T2 started in step S120 (step S132). Next, the living body detection function 22E detects that the subject 34 included in the first captured image 30B is not a living body (step S134). More specifically, if the subject 34 included in the first captured image 30B does not make the action according to the first output information output immediately before within the second predetermined time since the output of the first output information, the living body detection function 22E detects that the subject 34 is not a living body. The present routine ends. As described above, the living body detection function 22E may output the detection result from the output circuit 14 before the present routine ends.

On the other hand, if the eyes are not detected to be closed (step S112: No), the processing proceeds to step S136. In step S136, the first detection function 22C resets the timer T1 started in step S110 (step S136). The processing proceeds to the foregoing step S134.

In such a manner, the living body detection function 22E detects that the subject 34 is not a living body if the eyes of the subject 34 are not detected to be closed after the output of the eye closing output information.

As described above, the detection apparatus 20 according to the present embodiment includes the storage unit (storage circuit 24) and the processing circuit 22 connected to the storage unit. The processing circuit 22 includes the first output control function 22D and the living body detection function 22E. The first output control function 22D performs control so that first output information according to an action for the subject 34 to make after the eyes are closed is output in the first output form for giving a stimulus to a sense other than the sense of sight. The living body detection function 22E detects whether the subject 34 included in a first captured image 30B captured after the output of the first output information is a living body.

In such a manner, the detection apparatus 20 of the present embodiment detects whether the subject 34 included in the first captured image 30B is a living body by using the first captured image 30B captured after the first output information is output in the first output form for giving a stimulus to a sense other than the sense of sight.

Even if the eyes of the subject 34 to be detected are not open, whether the subject 34 is a living body can thus be detected by outputting the first output information according to the specific action in the first output form.

Consequently, the detection apparatus 20 according to the present embodiment can improve the user's usability.

If the subject 34 to be detected is not a living body and the first output information is output in the first output form, the subject 34 is not able to make the action according to the first output information. In other words, if the subject 34 is a non-living body such as an image of a living thing and a model of a living thing, the subject 34 is unable to make the action according to the first output information.

In addition to the foregoing effect, the detection apparatus 20 of the present embodiment can thus suppress spoofing of a living body if the subject 34 is a non-living body.

As described above, non-living bodies are not able to perform the action according to the first output information. In addition to the foregoing effects, the detection apparatus 20 of the present embodiment can thus suppress false detection of erroneously detecting a non-living body as a living body.

Second Embodiment

In the present embodiment, face detection is further performed before the output of the first output information.

Figure 5:
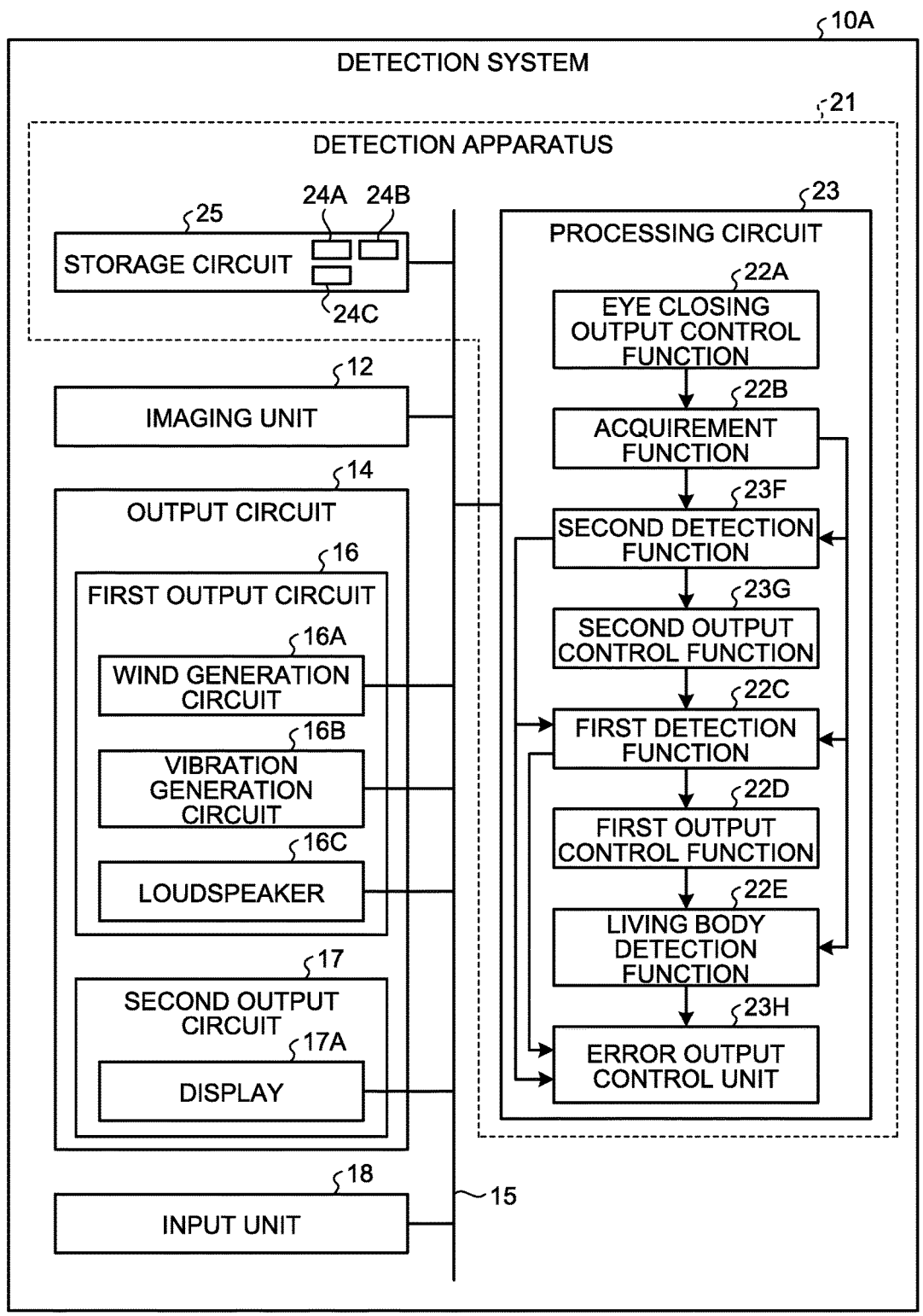
FIG. 5 is a diagram showing an example of a detection system according to a second embodiment.

FIG. 5 is a diagram showing an example of a detection system 10A according to the present embodiment. The detection system 10A includes the imaging unit 12, the output circuit 14, the input unit 18, and a detection apparatus 21. The imaging unit 12, the output circuit 14, the input unit 18, and the detection apparatus 21 are connected via the bus 15.

The detection system 10A is the same as the detection system 10 according to the first embodiment except that the detection apparatus 21 is provided instead of the detection apparatus 20.

The detection apparatus 21 includes a storage circuit 25 and a processing circuit 23. The storage circuit 25 and the processing circuit 23 are connected via the bus 15.

At least one of the imaging unit 12, the output circuit 14, the input unit 18, and the storage circuit 25 may be connected to the processing circuit 23 in a wired or wireless manner. At least one of the imaging unit 12, the output circuit 14, the input unit 18, and the storage circuit 25 may be connected with the processing circuit 23 via a network. The detection apparatus 21 may be implemented on a cloud server which performs processing on a cloud basis.

The storage circuit 25 stores various types of data. In the present embodiment, the storage circuit 25 stores a first output information management DB 24A, a second output information management DB 24B, and an error output information management DB 24C in advance. The first output information management DB 24A is the same as that of the first embodiment. Details of the second output information management DB 24B and the error output information management DB 24C will be described later.

Examples of the storage circuit 25 include a semiconductor memory device such as a RAM and a flash memory, a hard disk, and an optical disc. The storage circuit 25 may be a storage device arranged outside the detection apparatus 21. The storage circuit 25 may be a storage medium. Specifically, the storage medium may be one into which programs and various types of information are downloaded and stored, or temporarily stored, via a local area network (LAN), the Internet, or the like. The storage circuit 25 may include a plurality of storage media.

Next, the processing circuit 23 will be described. The processing circuit 23 includes the eye closing output control function 22A, the acquirement function 22B, a second detection function 23F, a second output control function 23G, the first detection function 22C, the first output control function 22D, the living body detection function 22E, and an error output control unit 23H. The eye closing output control function 22A, the acquirement function 22B, the first detection function 22C, the first output control function 22D, and the living body detection function 22E are the same as those of the first embodiment. In other words, the processing circuit 23 further includes the second detection function 23F, the second output control function 23G, and the error output control unit 23H in addition to the configuration of the processing circuit 22 according to the first embodiment.

The processing functions of the processing circuit 23 are stored in the storage circuit 25 in the form of computer-executable programs. The processing circuit 23 is a processor that reads the programs from the storage circuit 25 and executes the programs to implement the functions corresponding to the respective programs.

Having read the programs, the processing circuit 23 has the functions shown in the processing circuit 23 of FIG. 5. In FIG. 5, the eye closing output control function 22A, the acquirement function 22B, the second detection function 23F, the second output control function 23G, the first detection function 22C, the first output control function 22D, the living body detection function 22E, and the error output control unit 23H are described to be implemented by a single processing circuit 23.

A plurality of independent processors for implementing the respective functions may be combined to constitute the processing circuit 23. In such a case, the processors execute a program(s) to implement the respective functions. The processing functions may be configured as respective programs, and a single processing circuit may execute the programs. A specific function or functions may be implemented by a dedicated independent program execution circuit(s).

The second detection function 23F is an example of a second detection unit. The second detection function 23F detects a face within the imaging angle of view of the imaging unit 12 before at least the first output information is output.

To be more specific, the second detection function 23F detects a face 32A within the imaging angle of view by detecting the face 32A included in a second captured image 30A by using the second captured image 30A. The second detection function 23F may detect the face 32A included in the second captured image 30A by using a known image processing technology.

A description will be given with reference to FIG. 3A. For example, the second detection function 23F detects the face 32A included in the second captured image 30A by using a known face recognition technology. Here, the second detection function 23F may further identify the direction of the face 32A and/or the position of the face 32A within the imaging angle of view.

Referring back to FIG. 5, a description will be continued. In the present embodiment, the second detection function 23F preferably detects the face 32A included in the second captured image 30A before the first output information is output and after the eye closing output information is output by the eye closing output control function 22A.

The second detection function 23F preferably detects the face 32A included in the second captured image 30A before the first output information is output, before the eye-closed state of the subject 34 is detected by the first detection function 22C, and after the eye closing output information is output by the eye closing output control function 22A.

The second output control function 23G is an example of a second output control unit. The second output control function 23G outputs second output information in the first output form if the face 32A is not detected by the second detection function 23F. As described above, the first output form is an output form for giving a stimulus to a sense other than the sense of sight.

The second output information is output information for prompting the subject 34 to locate the face 32A within the imaging angle of view of the imaging unit 12. In other words, the second output information is output information according to an action to be made if the face 32A is not detected within the imaging angle of view of the imaging unit 12.

The action to be made if the face 32A is not detected within the imaging angle of view is an action of moving the face into the imaging angle of view. The second output information is output information for prompting this action.

In the present embodiment, the second output information includes at least one of a sound pattern, a vibration pattern, and a wind pattern according to the action of locating the face 32A within the imaging angle of view of the imaging unit 12.

The second detection function 23F registers the second output information into the second output information management DB 24B in advance. FIGS. 6A and 6B are schematic diagrams showing an example of a data configuration of the second output information management DB 24B and the error output information management DB 24C.

FIG. 6A is a schematic diagram showing an example of the data configuration of the second output information management DB 24B. The detection apparatus 21 previously registers the second output information corresponding to the action to be made if the face 32A is not detected within the imaging angle of view into the second output information management DB 24B.

A sound pattern, a vibration pattern, and a wind pattern are each registered in the second output information management DB 24B in advance as the second output information. The second output information is output information different from the first output information (see FIG. 2). Specifically, the sound pattern, the vibration pattern, and the wind pattern included in the second output information are different from the sound patterns, the vibration patterns, and the wind patterns included in the first output information, respectively.

For example, a sound pattern D1 included in the second output information is output information representing a sound "turn your face toward the camera."

The second output information needs only to include at least one of a sound pattern, a vibration pattern, and a wind pattern. Two or more patterns may be used in combination.

Referring back to FIG. 5, the second output control function 23G is an example of a second output control unit. The second output control function 23G controls the first output circuit 16 to output the second output information listed in the second output information management DB 24B in the first output form.

Specifically, the second output control function 23G controls the loudspeaker 16C to output sound of the sound pattern included in the second output information read from the second output information management DB 24B. The second output control function 23G controls the vibration generation circuit 16B to generate vibrations of the vibration pattern included in the second output information read from the second output information management DB 24B. The second output control function 23G controls the wind generation circuit 16A to generate wind of the wind pattern included in the second output information read from the second output information management DB 24B.

As a result, sound, vibrations, and wind according to the second output information output from the first output circuit 16 are output around the imaging unit 12. The subject 34 lying within the imaging angle of view can thus receive the instruction to move and locate the face 32A into the imaging angle of view of the imaging unit 12.

The second output control function 23G may calculate the intended direction and position of the face 32A with respect to the subject 34 lying in the vicinity of the imaging unit 12 on the basis of the direction and position of the face 32A in the imaging angle of view, identified by the second detection function 23F. The second output control function 23G may control the first output circuit 16 to output second output information representing the calculated direction and position in the first output form.

In the present embodiment, the first detection function 22C detects that the subject 34 is in an eye-closed state on the basis of the second captured image 30A after the processing of the second detection function 23F and the second output control function 23G. If there is a living body around the imaging unit 12, the first detection function 22C can thus detect that the subject 34 is in the eye-closed state after the face 32A of the subject 34 is located within the imaging angle of view of the imaging unit 12 by the second output control function 23G. In the present embodiment, the first output control function 22D can perform output control to output the first output information in the first output form if the face 32A is detected. In the present embodiment, the first output control function 22D can output the first output information in the first output form if the face 32A is detected and the subject 34 is detected to be in the eye-closed state.

The error output control unit 23H outputs error output information. The error output control unit 23H outputs the error output information in at least either one of the first and second output forms.

The error output information is output information indicating error contents. Examples of the error contents include a face detection error, an eye closing detection error, and a living body detection error. The face detection error represents that the face 32A is not detected by the second detection function 23F. The eye closing detection error represents that the eye-closed state is not detected by the first detection function 22C. The living body detection error represents the subject is not detected to be a living body by the living body detection function 22E. The error output information may be a signal pattern indicating the error contents.

In the present embodiment, the error output information includes at least one of a sound pattern, a vibration pattern, and a wind pattern according to the error contents.

The error output control unit 23H registers the error output information into the error output information management DB 24C in advance. FIG. 6B is a schematic diagram showing an example of the data configuration of the error output information management DB 24C.

Sound patterns, vibration patterns, and wind patterns are previously registered in the error output information management DB 24C as the error output information. The error output information is output information different from the first output information (see FIG. 2) and the second output information (see FIG. 6A). Specifically, the sound patterns, the vibration patterns, and the wind patterns included in the error output information are different from the sound patterns, the vibration patterns, and the wind patterns included in the first output information and the second output information, respectively.

Different pieces of error output information corresponding to the respective error contents are previously registered in the error output information management DB 24C. In the example shown in FIG. 6B, different sound patterns (G1 to G3), different vibration patterns (H1 to H3), and different wind patterns (I1 to I3) corresponding to the respective error contents are registered in advance.

For example, the sound pattern G1 is output information representing a sound "no face is detected." For example, the sound pattern G2 is output information representing a sound "eye closing is not detected." The sound pattern G3 is output information representing a sound "living body detection error occurs."

If the face detection error is accepted from the second detection function 23F, the error output control unit 23H may control the output circuit 14 to output the error output information corresponding to the face detection error in the error output information management DB 24C.

Specifically, the error output control unit 23H controls the loudspeaker 16C to output sound of the sound pattern included in the error output information corresponding to the accepted error contents in the error output information management DB 24C. The error output control unit 23H controls the vibration generation circuit 16B to generate vibrations of the vibration pattern included in the error output information corresponding to the accepted error contents in the error output information management DB 24C. The error output control unit 23H controls the wind generation circuit 16A to generate wind of the wind pattern included in the error output information corresponding to the accepted error contents in the error output information management DB 24C.

As a result, the sound, vibrations, and wind according to the error contents detected by the processing circuit 23 are output into the imaging angle of view of the imaging unit 12.

Any one or two of the sound, vibration, and wind patterns may be previously registered in the error output information management DB 24C as error output information. In other words, the error output information management DB 24C may control the first output circuit 16 to output at least one of the sound, vibration, and wind patterns according to the error contents as the error output information.

The error output control unit 23H controls the output circuit 14 to output the error output information, whereby the error contents are output into the imaging angle of view of the imaging unit 12.

Figure 7:
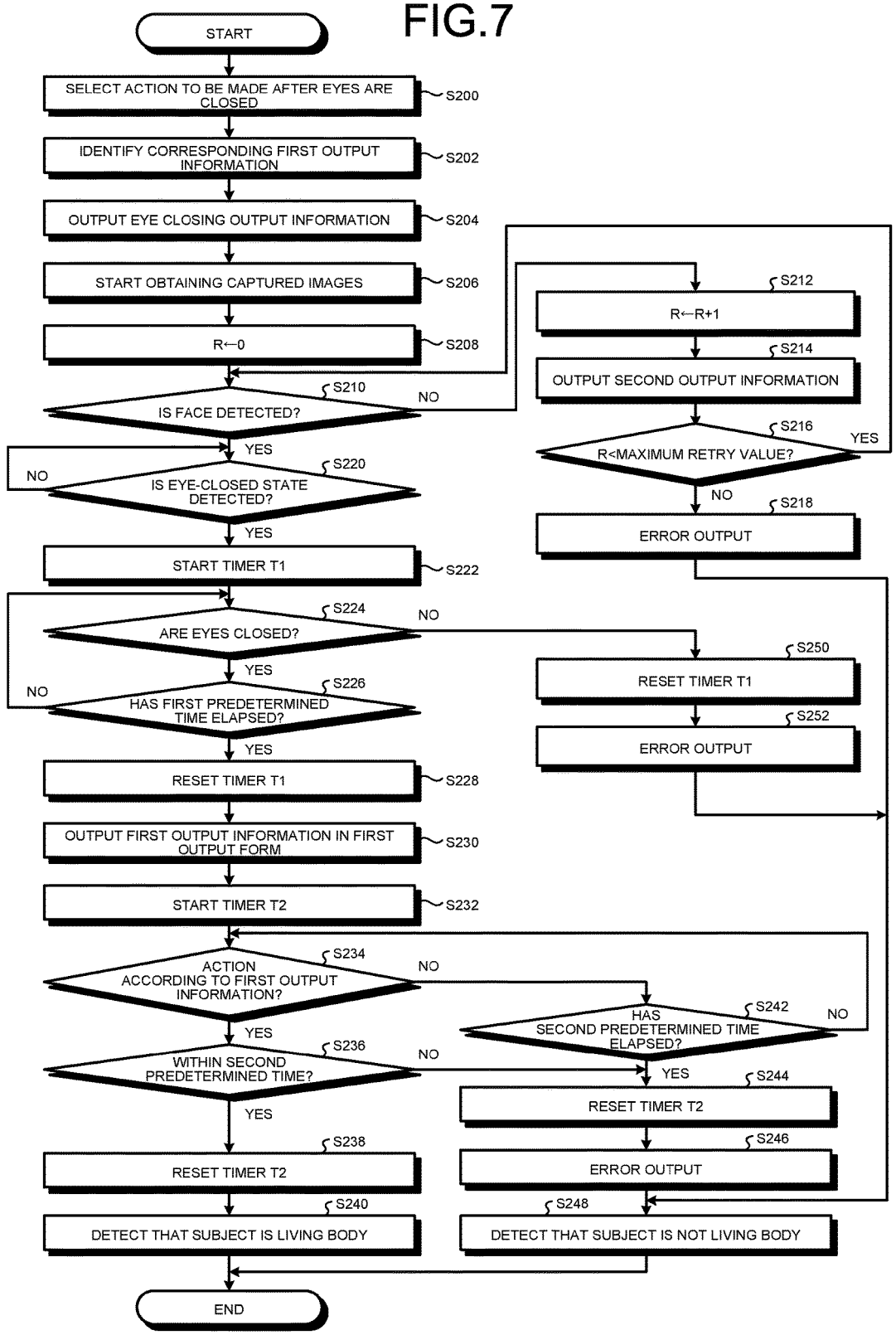
FIG. 7 is a flow chart showing an example of the procedure of the detection processing.

Next, an example of a procedure of the detection processing performed by the processing circuit 23 will be described. FIG. 7 is a flow chart showing an example of the procedure of the detection processing performed by the processing circuit 23.

The processing circuit 23 performs the detection processing shown in FIG. 7 when to perform the detection processing is instructed. For example, an instruction to perform the detection processing is input by the user's operation instructions to the input unit 18 or the like. The processing circuit 23 may perform the detection processing shown in FIG. 7 at predetermined time intervals.

Initially, the processing circuit 23 performs the processing of steps S200 to S206 in the same manner as with steps S100 to S106 of the first embodiment (see FIG. 4).

More specifically, the first output control function 22D initially selects one of the plurality of actions to be made after the eyes are closed, registered in the first output information management DB 24A (step S200). Next, the first output control function 22D identifies the first output information corresponding to the action to be made after the eyes are closed, selected in step S200, from the first output information management DB 24A (step S202).

Next, the eye closing output control function 22A controls the output circuit 14 to output the eye closing output information (step S204). Next, the acquirement function 22B starts obtaining captured images 30 captured by the imaging unit 12 (step S206). By the processing of step S206, the acquirement function 22B starts processing for sequentially obtaining the captured images 30 captured by the imaging unit 12, and sequentially outputting the captured images 30 to the second detection function 23F, the first detection function 22C, and the living body detection function 22E in the order of acquisition.

Next, the second detection function 23F resets a counter R indicating the number of retries of face detection (step S208). In step S208, the second detection function 23F sets the value of the counter R at "0."

Next, the second detection function 23F determines whether the face 32A is successfully detected in a second captured image 30A (step S210). If the second detection function 23F cannot detect the face 32A in the second captured image 30A (step S210: No), the processing proceeds to step S212. The second detection function 23F counts up the counter R indicating the number of retries of face detection by "1" (step S212). The processing proceeds to step S214.

In step S214, the second output control function 23G controls the first output circuit 16 to output the second output information for prompting the subject 34 to locate the face 32A within the imaging angle of view in the first output form (step S214). By the processing of step S214, the second output information is output around the imaging unit 12. If the subject 34 lying within the imaging angle of view is a living body, the living body can accept the instruction to locate the face 32A within the imaging angle of view of the imaging unit 12.

Next, the second output control function 23G determines whether the number of retries R is smaller than a predetermined maximum retry value (step S216). The maximum retry value may be previously defined as an integer equal to or greater than '2'. The maximum retry value may be able to be changed as appropriate according to the user's operation instructions to the input unit 18 or the like.

If the number of retries R is smaller than the predetermined maximum retry value (step S216: Yes), the processing returns to the foregoing step S210. If the number of retries R is equal to or greater than the maximum retry value (step S216: No), the processing proceeds to step S218. If the determination in step S216 is negative (step S216: No), the second output control function 23G outputs an error signal representing the error contents "face detection error" to the error output control unit 23H.

In step S218, the error output control unit 23H controls the output circuit 14 to output the error output information corresponding to the accepted error contents "face detection error" (step S218). By the processing of step S218, the error output information according to the error contents "face detection error" is output. The processing then proceeds to step S248 to be described later.

On the other hand, in the foregoing step S210, if the second detection function 23F detects the face 32A (step S210: Yes), the processing proceeds to step S220.

The processing circuit 23 then performs the processing of steps S220 to S244 in the same manner as with steps S110 to S132 (see FIG. 4) according to the first embodiment.

Specifically, the first detection function 22C repeats a negative determination (step S220: No) until the subject is detected to be in the eye-closed state on the basis of the second captured image 30A obtained by the acquirement function 22B. If the first detection function 22C detects that the subject is in the eye-closed state (step S220: Yes), the processing proceeds to step S222.

In step S220, if recognition the negative determination continues for more than a predetermined time or more than a predetermined number of times, the error output control unit 23H may control the first output circuit 16 to output the error output information corresponding to the error contents "eye closing detection error." The processing may then proceed to step S248.

Next, in step S222, the first detection function 22C starts the timer T1 for counting the foregoing first predetermined time (step S222). Then, by using a new second captured image 30A output from the acquirement function 22B, the first detection function 22C determines whether the eyes of the person 32 included in the second captured image 30A are closed (step S224).

If the first detection function 22C determines that the eyes are closed (step S224: Yes), the processing proceeds to step S226. In step S226, the first detection function 22C determines whether the first predetermined time has elapsed since the start of the timer T1 in step S222 (step S226).

If the first predetermined time has not elapsed (step S226: No), the processing returns to the foregoing step S224. On the other hand, if the first predetermined time has elapsed (step S226: Yes), the processing proceeds to step S228. In step S228, the first detection function 22C resets the timer T1 started in step S222 (step S228).

Next, the first output control function 22D outputs the first output information in the first output form (step S230). By the processing of step S230, the first output information according to the action to be made after the eyes are closed is output in the first output form for giving a stimulus to a sense other than the sense of sight. More specifically, at least one of the sound, vibration, and wind patterns according to the action to be made after the eyes are closed is output from the first output circuit 16.

As a result, the person 32 provided with the first output information makes the action according to the first output information output in step S230.

Next, the living body detection function 22E starts the timer T2 for counting the foregoing second predetermined time (step S232). Next, by using a new first captured image 30B output from the acquirement function 22B, the living body detection function 22E determines whether the subject 34 included in the first captured image 30B makes the action according to the first output information output in step S230 (step S234).

If the living body detection function 22E determines that the action according to the first output information is made (step S234: Yes), the processing proceeds to step S236. In step S236, the living body detection function 22E determines whether the elapsed time since the start of the timer T2 in step S232 is within the second predetermined time (step S236).

If the determination in step S236 is positive (step S236: Yes), the processing proceeds to step S238. In step S238, the living body detection function 22E resets the timer T2 started in step S232 (step S238).

Next, the living body detection function 22E detects that the subject 34 included in the first captured image 30B is a living body (for example, person 32) (step S240). The present routine ends. As described above, the living body detection function 22E may output the detection result from the output circuit 14 before the present routine ends.

On the other hand, if the determination in the foregoing step S234 is negative (step S234: No), the processing proceeds to step S242. In step S242, the living body detection function 22E determines whether the elapsed time since the start of the timer T2 in step S232 exceeds the second predetermined time (step S242).

If the determination in step S242 is negative (step S242: No), the processing returns to the foregoing step S234. On the other hand, if the determination in step S242 is positive (step S242: Yes), the processing proceeds to step S244. If the determination in the foregoing step S236 is negative (step S236: No), the processing also proceeds to step S244.

In step S244, the living body detection function 22E resets the timer T2 started in step S232 (step S244).

In the present embodiment, the living body detection function 22E then outputs the error signal representing the error contents "living body detection error" to the error output control unit 23H. The processing proceeds to step S246.

In step S246, the error output control unit 23H controls the output circuit 14 to output the error output information corresponding to the accepted error contents "living body detection error" (step S246). By the processing of step S246, the error output information according to the error contents "living body detection error" is output. The processing then proceeds to step S248.

In step S248, the living body detection function 22E detects that the subject 34 included in the first captured image 30B is not a living body (step S248). In other words, if the subject 34 included in the first captured image 30B does not make the action according to the first output information output immediately before within the second predetermined time after the output of the first output information, the living body detection function 22E detects that the subject 34 is not a living body. The present routine ends.

On the other hand, if the eye-closed state is not detected in the foregoing step S224 (step S224: No), the processing proceeds to step S250. In step S250, the first detection function 22C resets the timer T1 started in step S222 (step S250).

The eye closing output control function 22A then outputs the error signal representing the error contents "eye closing detection error" to the error output control unit 23H. The processing proceeds to step S252.

In step S252, the error output control unit 23H controls the output circuit 14 to output the error output information corresponding to the accepted error contents "eye closing detection error" (step S252). By the processing of step S252, the error output information according to the error contents "eye closing detection error" is output. The processing then proceeds to the foregoing step S248.

As described above, the second detection function 23F of the detection apparatus 21 according to the present embodiment detects a face within the imaging angle of view of the imaging unit 12 at least before the first output information is output. If no face is detected, the second output control function 23G outputs the second output information for prompting the subject 34 to locate its face within the imaging angle of view in the first output form.

As a result, if the face 32A of the living body with the eyes closed is located outside the imaging angle of view of the imaging unit 12, the detection apparatus 21 of the present embodiment can output appropriate output information.

Consequently, in addition to the effects of the first embodiment, the detection apparatus 21 of the present embodiment can further improve the user's usability.

Application Examples

Next, specific application examples of the detection system 10 and the detection system 10A described in the foregoing embodiments will be described.

The detection systems 10 and 10A described in the foregoing embodiments may be applied to, for example, a smart device, a face recognition terminal, and an image forming apparatus.

Figure 8:
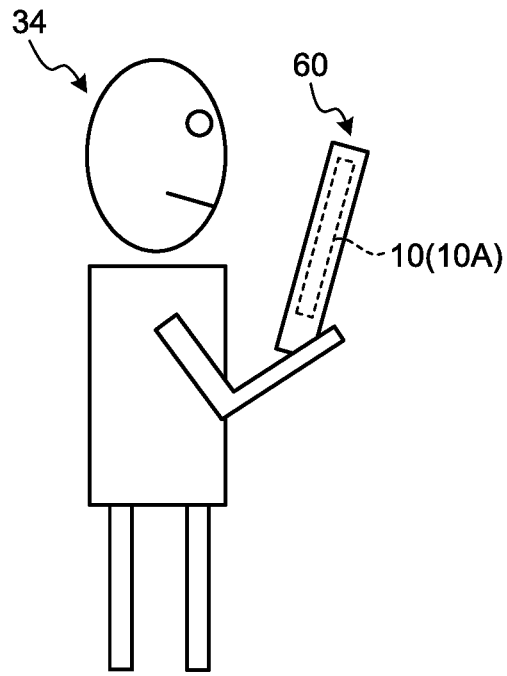
FIG. 8 is a diagram showing an example of a smart device to which a detection system is applied.

FIG. 8 is a diagram showing an example of a smart device 60 to which the detection system 10 or 10A is applied. The smart device 60 is a portable terminal such as a tablet terminal and a smartphone. In the example shown in FIG. 8, the smart device 60 includes the detection system 10 or 10A. If the detection system 10 or 10A is applied to the smart device 60, the subject 34 holding the smart device 60 is the subject 34 targeted for the living body detection.

Figure 9:
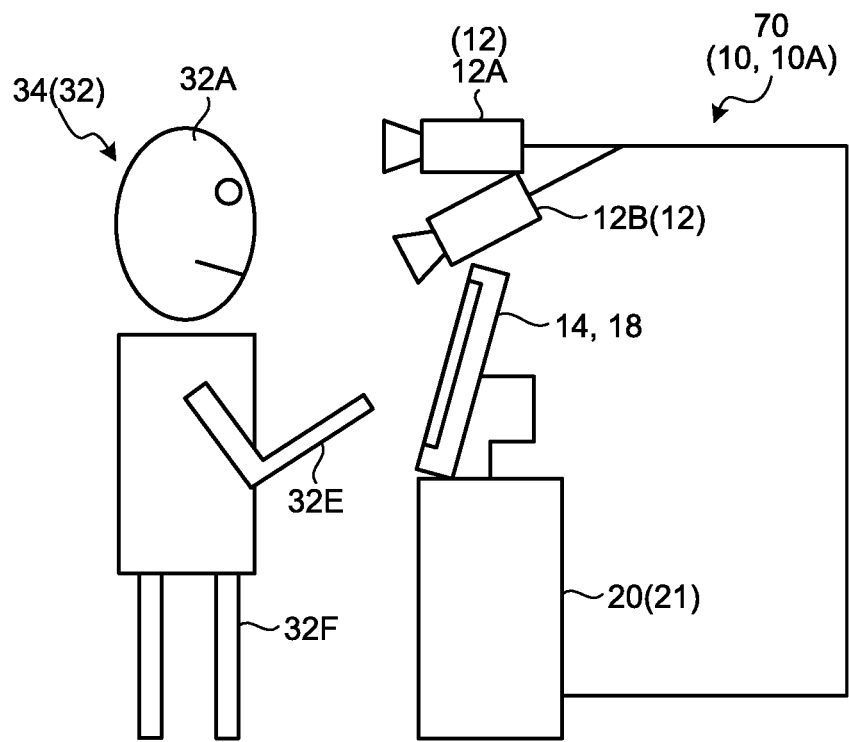
FIG. 9 is a diagram showing an example of a face recognition terminal to which a detection system is applied.

FIG. 9 is a diagram showing an example of a face collation terminal 70 to which the detection system 10 or 10A is applied. The face recognition terminal 70 is an apparatus for collating the face 32A of the person 32. In the case shown in FIG. 9, the detection apparatus 20 or 21 may be mounted on the main body of the face recognition terminal 70. The output circuit 14, the input unit 18, and the imaging unit 12 may be arranged around the subject 34 using the face recognition terminal 70.

The imaging unit 12 is preferably arranged so that the imaging angle of view covers the entire body of the person 32 as the subject 34. For that purpose, a plurality of imaging units 12 may be provided. Such a plurality of imaging units 12 are installed in advance so that images of different parts of the body of the person 32 can be captured.

Specifically, as shown in FIG. 9, the imaging units 12 include an imaging unit 12A and an imaging unit 12B. The imaging unit 12A can capture an image of the face 32A of the person 32. The imaging unit 12B can capture an image of hands 32E and legs 32F of the person 32. The detection system 10 or 10A may detect the actions of the person 32 (opening the eyes, opening the mouth, raising the eyebrows, moving the head, moving the hands, moving the shoulders, and moving the legs) by using the captured images captured by the plurality of imaging units 12 (imaging units 12A and 12B).

Figure 10:
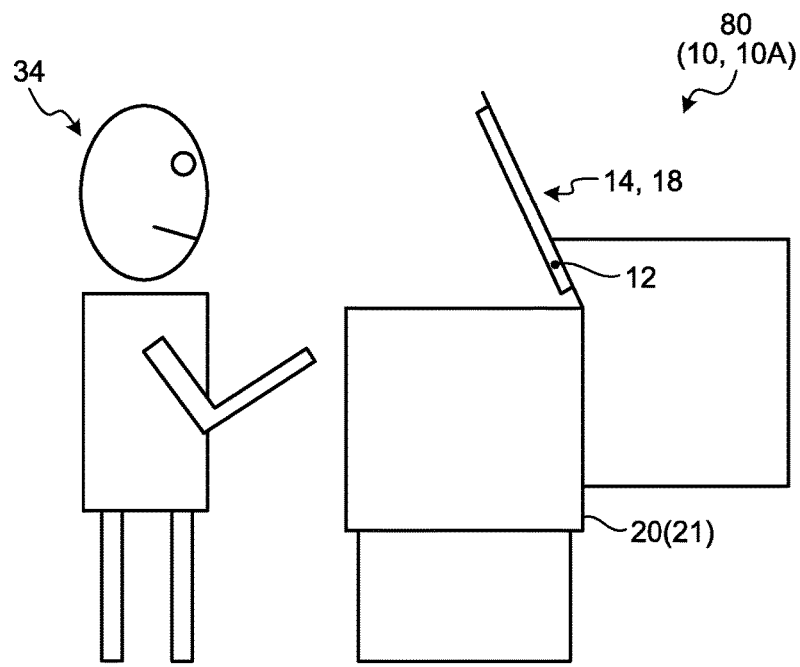
FIG. 10 is a diagram showing an example of an image forming apparatus to which a detection system is applied.

FIG. 10 is a diagram showing an example of an image forming apparatus 80 to which the detection system 10 or 10A is applied. Examples of the image forming apparatus 80 include a multifunction peripheral (MFP), a copying machine, and a printing apparatus. In the example shown in FIG. 10, the detection apparatus 20 or 21 is mounted on the main body of the image forming apparatus 80. The output circuit 14, the input unit 18, and the imaging unit 12 may be arranged around the user who uses the image forming apparatus 80.

Figure 11:
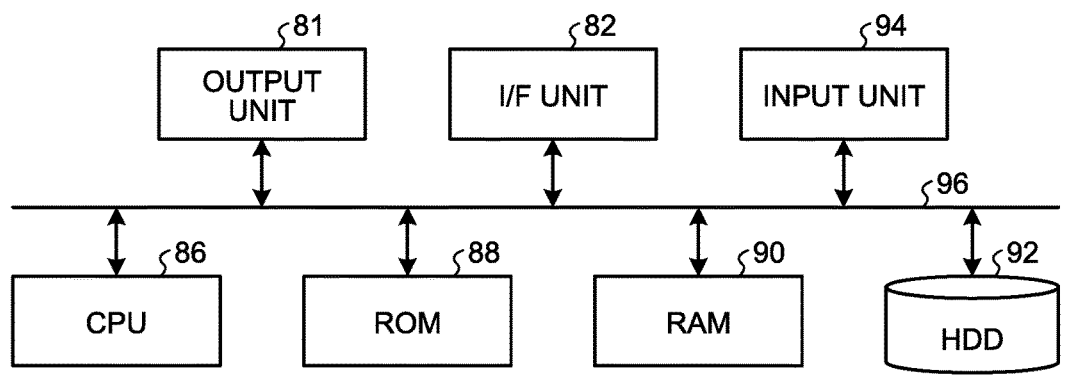
FIG. 11 is a hardware configuration diagram of a detection apparatus.

Next, an example of a hardware configuration of the detection apparatuses 20 and 21 according to the foregoing embodiments will be described. FIG. 11 is an example of a hardware configuration diagram of the detection apparatuses 20 and 21 according to the foregoing embodiments.

The detection apparatuses 20 and 21 according to the foregoing embodiments have a hardware configuration using an ordinary computer. Specifically, the detection apparatuses 20 and 21 each include a controller such as a central processing unit (CPU) 86, a storage device such as a read-only memory (ROM) 88, a random access memory (RAM) 90, and a hard disk drive (HDD) 92, an I/F unit 82, an output unit 81, an input unit 94, and a bus 96. The I/F unit 82 is an interface with various devices. The output unit 81 outputs various types of information such as output information. The input unit 94 accepts the user's operations. The bus 96 connects the units.

In the detection apparatuses 20 and 21 according to the foregoing embodiments, the CPU 86 reads a program(s) from the ROM 88 into the RAM 90 and executes the program(s) to implement the foregoing various functions on the computer.

The program(s) for performing the processing executed by the detection apparatuses 20 and 21 of the foregoing embodiments may be stored in the HDD 92. The program(s) for performing the processing executed by the detection apparatuses 20 and 21 of the foregoing embodiments may be provided as preinstalled in the ROM 88.

The program(s) for performing the processing executed by the detection apparatuses 20 and 21 of the foregoing embodiments may be stored as a file of installable format or executable format in a computer-readable storage medium and provided as a computer program product. Examples of the computer-readable storage medium include a CD-ROM, a CD-R, a memory card, a digital versatile disc (DVD), and a flexible disk (FD). The program(s) for performing the processing executed by the detection apparatuses 20 and 21 of the foregoing embodiments may be stored in a computer connected to a network such as the Internet, and may be downloaded and provided via the network. The program(s) for performing the processing executed by the detection apparatuses 20 and 21 of the foregoing embodiments may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection apparatus comprising:
a memory; and
processing circuitry configured to operate as:
a first output control unit for performing control to output first output information in a first output form for giving a stimulus to a sense other than a sense of sight, the first output information being made according to an action for a subject to make after closing of an eye; and
a living body detection unit for detecting whether the subject included in a first captured image captured after the first output information is output is a living body.

2. The detection apparatus according to claim 1, wherein if the subject is determined to make the action according to the first output information on a basis of the first captured image, the living body detection unit detects that the subject is a living body.

3. The detection apparatus according to claim 1, comprising a first detection unit for detecting that the subject is in an eye-closed state on a basis of a second captured image captured before the first output information is output, wherein the first output control unit performs the control to output the first output information in the first output form if the subject is detected to be in the eye-closed state.

4. The detection apparatus according to claim 1, comprising a first detection unit for detecting that the subject maintains an eye-closed state for a first predetermined time on a basis of a second captured image captured before the first output information is output, wherein the first output control unit performs the control to output the first output information in the first output form if the subject is detected to maintain the eye-closed state for the first predetermined time.

5. The detection apparatus according to claim 1, wherein the living body detection unit detects whether the subject included in the first captured image is a living body on a basis of the first captured image that is captured during a second predetermined time after the first output information is output.

6. The detection apparatus according to claim 1, wherein the first output information is output information for prompting an action of moving at least a part of a body.

7. The detection apparatus according to claim 6, wherein the first output information is output information for prompting at least one of actions of opening the eye, opening a mouth, moving a head, moving a hand, moving a shoulder, and moving a leg.

8. The detection apparatus according to claim 1, wherein:
the first output information is output information according to an action other than that of opening the eye; and
if the subject included in the first captured image is determined to make the action according to the first output information while maintaining an eye-closed state, the living body detection unit detects that the subject is a living body.

9. The detection apparatus according to claim 1, comprising:
a second detection unit for detecting a face within an imaging angle of view of an imaging unit before the first output information is output, the imaging unit obtaining the first captured image; and
a second output control unit for performing control to output second output information for prompting the subject to locate a face thereof within the imaging angle of view in the first output form if the face is not detected.

10. The detection apparatus according to claim 9, wherein the first output control unit performs the control to output the first output information in the first output form if the face is detected.

11. The detection apparatus according to claim 1, wherein the first output form is at least one of wind, sound, and vibration.

12. The detection apparatus according to claim 1, further comprising an output unit for outputting the first output information.

13. The detection apparatus according to claim 12, wherein the output unit includes at least one of a wind generation circuit, a vibration generation circuit, and a loudspeaker.

14. A detection method comprising:
performing control to output first output information in a first output form for giving a stimulus to a sense other than a sense of sight, the first output information being made according to an action for a subject to make after closing of an eye; and
detecting whether the subject included in a first captured image captured after the first output information is output is a living body.

15. The detection method according to claim 14, further comprising, if the subject is determined to make the action according to the first output information on a basis of the first captured image, detecting that the subject is a living body.

16. The detection method according to claim 14, further comprising detecting that the subject is in an eye-closed state on a basis of a second captured image captured before the first output information is output, performing the control to output the first output information in the first output form if the subject is detected to be in the eye-closed state.

17. The detection method according to claim 14, further comprising detecting that the subject maintains an eye-closed state for a first predetermined time on a basis of a second captured image captured before the first output information is output, performing the control to output the first output information in the first output form if the subject is detected to maintain the eye-closed state for the first predetermined time.

18. The detection method according to claim 14, further comprising detecting whether the subject included in the first captured image is a living body on a basis of the first captured image that is captured during a second predetermined time after the first output information is output.

19. The detection method according to claim 14, wherein the first output information is output information for prompting an action of moving at least a part of a body.

20. A computer program product comprising a non-transitory computer-readable medium that stores therein a computer program for causing a computer to perform:
performing control to output first output information in a first output form for giving a stimulus to a sense other than a sense of sight, the first output information being made according to an action for a subject to make after closing of an eye; and
detecting whether the subject included in a first captured image captured after the first output information is output is a living body.

* * * * *